United States Patent

Miller

[15] 3,651,408

[45] Mar. 21, 1972

[54] DIGITAL COMMUNICATION SYSTEMS

[72] Inventor: Michael Robert Miller, Watford, England

[73] Assignee: Her Majesty's Postmaster General, London, England

[22] Filed: May 26, 1969

[21] Appl. No.: 827,680

[30] Foreign Application Priority Data

May 31, 1968 Great Britain ......................26,270/68

[52] U.S. Cl. ..........................................325/58, 179/15 BS

[51] Int. Cl. ..........................................H04b 1/00

[58] Field of Search ..........................325/53, 54, 58, 60, 63; 179/15 BS, 15 AE, 15 AL, 15 AT; 178/58, 69.5; 325/58; 343/179; 340/170, 181, 184, 187, 207, 213, 224, 414, 416

[56] References Cited

UNITED STATES PATENTS

| | | | |
|---|---|---|---|
| 3,424,864 | 1/1969 | Williams | 325/58 |
| 3,504,125 | 3/1970 | Inose et al. | 179/15 BS |
| 3,504,126 | 3/1970 | Inose et al. | 179/15 BS |

*Primary Examiner*—Robert L. Griffin
*Assistant Examiner*—Albert J. Mayer
*Attorney*—Hall & Houghton

[57] ABSTRACT

A digital communications system including a plurality of transmission centers interconnected by transmission paths, in which each center has a local oscillator determining the digit times at that center and the frequencies of the oscillators are controlled in response to the adjacent oscillators by reference to incoming signals. In such a system it has been found that incorrect modes can be set up in which large phase differences between oscillators persist as a result of the presence of closed control rings in the system, and according to this invention the presence of an incorrect mode is detected by obtaining an indication whenever the phase of any oscillator departs by more than 90° from that of the oscillator of a particular center designated as the reference center. When the indication has been produced for a predetermined period of time the closed control rings are disabled leaving only oscillator control paths radiating from the reference center, until the indication is removed. The information transmission paths are not affected by the presence of the indication.

8 Claims, 8 Drawing Figures

MICHAEL R. MILLER,
INVENTOR

BY Hall & Houghton
ATTORNEY

MICHAEL R. MILLER

INVENTOR

BY

ATTORNEY

MICHAEL R. MILLER
INVENTOR
BY Hall & Houghton
ATTORNEY

MICHAEL R. MILLER
INVENTOR
BY Hall & Houghton
ATTORNEY

MICHAEL R MILLER
INVENTOR
BY Hall & Houghton
ATTORNEY

INVENTOR.
MICHAEL ROBERT MILLER

DIGITAL COMMUNICATION SYSTEMS

This invention relates to digital communication systems and in particular to P.C.M. communication systems.

Such systems comprise groups of transmission centers interconnected by transmission paths, each center including a local oscillator for determining frame, slot and digit times of that center. Due to changes in phase between oscillators of centers at either end of any particular transmission path, and to transmission delays provided by the path itself, incoming digits to a center may arrive at times which do not correspond to the digit times of the receiving center. Means for effecting synchronization between incoming digit times to a transmission center and local digit times of that center have been proposed, for example, in copending British Patent specification Nos. 1,130,401, 1,154,711 and 1,219,082.

In a P.C.M. communication system, there are normally a number of closed loops defined by transmission paths between transmission centers and it is possible for a situation to arise in which the phase change between oscillators of centers around the loop can equal or exceed 360° without the usual form of synchronized apparatus, referred to above, recognizing the situation. The loop concerned is then in an out-of-phase operating mode and this constitutes a malfunction of the system. In a simple case of three transmission centers directly connected to each other, the oscillator of a first one of the centers may be at zero phase whilst the oscillators of the other two centers may have phase differences of +120° and −120° relative to the oscillator of the first center. Whilst the synchronizing apparatus in the first center will detect the true phase difference of the oscillators of the other two centers, the synchronizing apparatus of each of the other two centers will detect the true phase of the first center but will recognize an apparent error of 120° between the phases of their own oscillators instead of 240° in the opposite sense. This is an out-of-phase mode of operation which it is required to avoid.

It is an object of the invention to overcome the above difficulty.

According to the present invention there is provided a digital communications system including at least three transmission centers interconnected by transmission paths, each center having a local timing oscillator which determines the digit times of that center, the frequency of the oscillator being adjustable in response to a control signal, one of said centers being designated as the reference center, and there being provided in each one of the other centers comparator means for comparing the times of digits of that center with the times of digits received from other centers to which it is connected, and means for combining the outputs of the comparator means to produce the control signal tending to bring the local timing oscillator into synchronism with that of the reference center, wherein there is provided means for producing an alarm signal whenever the condition exists that the time difference representing the phase difference between the local oscillator of any one of the other centers and the local oscillator of the reference center exceeds in magnitude a threshold value not greater than 90° for a predetermined period of time, and in response to the alarm signal the control signal of the local timing oscillator of each one of the other centers becomes dependent on the output of a single one only of the comparator means of the particular center until the condition is removed. In operation of the comparators, compensation is made, where necessary, for transmission delays provided by the transmission paths so that alarm signals are generated only in response to time differences between incoming and local digits which arise due to phase differences between the local oscillator of the center concerned and the local oscillator of the said one center.

The present invention is based upon detection of true phase errors between the reference or master transmission center and individual ones of the other transmission centers rather than detection of phase error between one center and another center to which it is directly connected (which is not necessarily the nominated master center) and preventing an out-of-phase mode arising by taking preventive action when the magnitude of any such true phase error, regardless of the sense of the error, exceeds a threshold value, such as, for example, 90°.

In one embodiment of a practical t.d.m. digital communications system, there may be at least three interconnected primary transmission centers one of which (the master primary center) is directly connected to each of the other primary centers. Each primary center will be a parent center directly connected to one or more secondary (district) centers; at least some of the secondary centers are directly connected to each other and possibly also directly connected to primary centers other than the nominal parent primary center. Each secondary center may, in turn, be a parent center directly connected to one or more ternary (group) centers; at least some of the ternary centers are directly connected to each other and possibly also directly connected at least to secondary centers other than the nominal parent center. Each of the primary, secondary and ternary centers has its own local timing oscillator which determines the frame, slot and digit times of that center. Each of the primary centers (other than the master center) includes a comparator operable to compare the times of the digits incoming to that center from the master center with local digit times of that center to generate a first phase error signal, and means responsive to this first phase error signal representing a true phase difference between the local oscillator of the primary center and the local oscillator of the master center having a magnitude greater than 90° and existing for a predetermined period of time to transmit an alarm signal to the master primary center. At the secondary (district) center level, there is provided a comparator in each secondary center operable to compare the times of digits incoming to that center from its parent primary center with local digit times of that secondary center to generate a first phase difference signal; the parent primary center also transmits the first phase error signal to each of the secondary centers of which it is parent. Each secondary center includes an adder operable to add the first phase error signal and the first phase difference signal to produce a second phase error signal indicative of phase error between that secondary center and the master primary center, and means responsive to a second phase error signal representing a true phase difference between the local oscillator of that secondary center and the local oscillator of the master center having a magnitude greater than 90° and existing for a predetermined time, to transmit an alarm signal to the master primary center. For each ternary (group) center to which it is parent, a secondary center has a comparator operable to compare the times of digits incoming to the secondary center from the ternary center concerned with local digit times of that secondary center to generate a second phase difference signal which together with the second phase error signal is fed to an adder which produces a third phase error signal indicative of phase error between that ternary center and the master primary center, and the parent secondary center also includes means responsive to a third phase error signal representing a true phase difference between the local oscillator of that ternary center and the local oscillator of the master primary center having a magnitude greater than 90° and existing for a predetermined time to transmit an alarm signal to the master primary center.

The master primary center includes means responsive to any alarm signal it receives to transmit a control signal to each of the primary, secondary and ternary centers to cause temporary interruption of the control of the oscillator of the center concerned by centers (whether of the same or different order) other than its parent center. Thus, in response to receipt of an alarm signal from any transmission center, the master transmission center initiates a temporary interruption of all control connections which form closed loops between centers. Thus, each of the transmission centers becomes temporarily directly connected only to its parent center for control of its oscillator thereby allowing the system to have only one operating mode. None of the information transmission paths is disabled by the alarm signal and aligners provided at the input to each center operate to synchronize incoming data with the local oscillator. As previously mentioned, in generating an alarm signal, it may be necessary to compensate for effects of transmission delay of digits incoming to a transmission center from its parent center in order to ensure that an alarm signal is generated only when a true phase error of more than 90° exists between the oscillator of a transmission center and that of the master center.

Should the system include transmission centers which are directly connected only to their parent center, then provision for generation of alarm signals is not required in those centers and neither would control signals (for effecting temporary interruption of connections) be transmitted to such center.

In the embodiment described above, the primary centers generate their own alarms and the alarm signals for the secondary and ternary centers are generated at the secondary centers. This is convenient and economical from a practical viewpoint but is not essential. Instead, each secondary and ternary center could include means for generating its own alarm signals but this would require facilities for transmitting alarm signals to the master primary center from main, secondary and ternary centers and also provision for transmitting the said second phase error signals to ternary centers from their parent secondary centers.

In an alternative embodiment of the invention, including $n$ orders of transmission centers, i.e., primary, secondary, ternary etc., in which each ternary center has a parent secondary center and each secondary center has a parent primary center which in turn is directly connected to a master primary center, each center has a comparator for determining the phase difference between its local oscillator and that of its parent center. In order for the $n$th order center oscillator to have a phase error greater than 90° relative to the master primary center, the oscillator of at least one of the centers along the path from the master primary center to the $n$th order center concerned must have a phase difference relative to the oscillator of its parent center of at least $90°/n$ (i.e., in a system having primary, secondary and ternary exchanges a relative phase difference of 30°). Each transmission center is provided with a comparator for determining the phase of its local oscillator relative to the phase of the oscillator of its parent center and, in response to a phase difference greater in magnitude than $90°/n$, to send an alarm signal to the master primary center which responds and transmits control interruption signals as previously described.

In the event that a connection between the master center and any of the primary centers is broken, provision is made for recognition of such a break and for consequent actuation of another primary center to receive alarm signals from the other centers and to generate and transmit interruption control signals to the remaining centers. In the event that a secondary center becomes disconnected from its parent primary center or a ternary center becomes disconnected from its parent secondary center, provision is made for it to send alarm signals to and receive control interruption signals from the master center via an alternative route.

In a system such as described above, the ternary center usually will be directly connected to further transmission centers which may be operated as slaves to their parent ternary centers and not include means for generating alarm signals or for receiving and responding to control interruption signals as proposed by the present invention.

The alarm and control signals can be coded and transmitted in digital form in selected time slots of successive frames, or they can be transmitted in analogue form over DC transmission paths. Both these techniques are well known in the communication art.

The phase error and phase difference signals referred to above can be generated by comparison of the times of a selected digit incoming from a transmission path to a transmission center and that of a local digit time of that center. In one embodiment a linear DC error or difference signal is generated by applying pulses at the two digit times as respective setting and resetting inputs to a trigger, the output of which is fed to a lowpass R-C filter, the filter output being a DC signal the sign and magnitude of which represent the said phase error or phase difference, as the case may be. This DC signal is applied as one input to a differential amplifier which receives a second input derived from a DC signal generated in like manner by the transmission center at the other end of the transmission path. The differential amplifier output then represents the difference in phase between the oscillators of the transmission centers connected at either end of the transmission path, apparent phase errors due to transmission delay introduced by the transmission path having been cancelled out in taking the difference of the two DC input signals.

The phase error signal or phase difference signal may also be generated from comparison only of incoming and local digit times at the transmission center concerned, and may have linear or quantized form. In this case, the resultant signal will contain an element representing transmission delay introduced by the transmission path concerned and for which compensation will need to be made before generating an alarm signal.

By way of example, the invention will be described in greater detail with reference to the accompanying drawings, in which.

Figure 1:
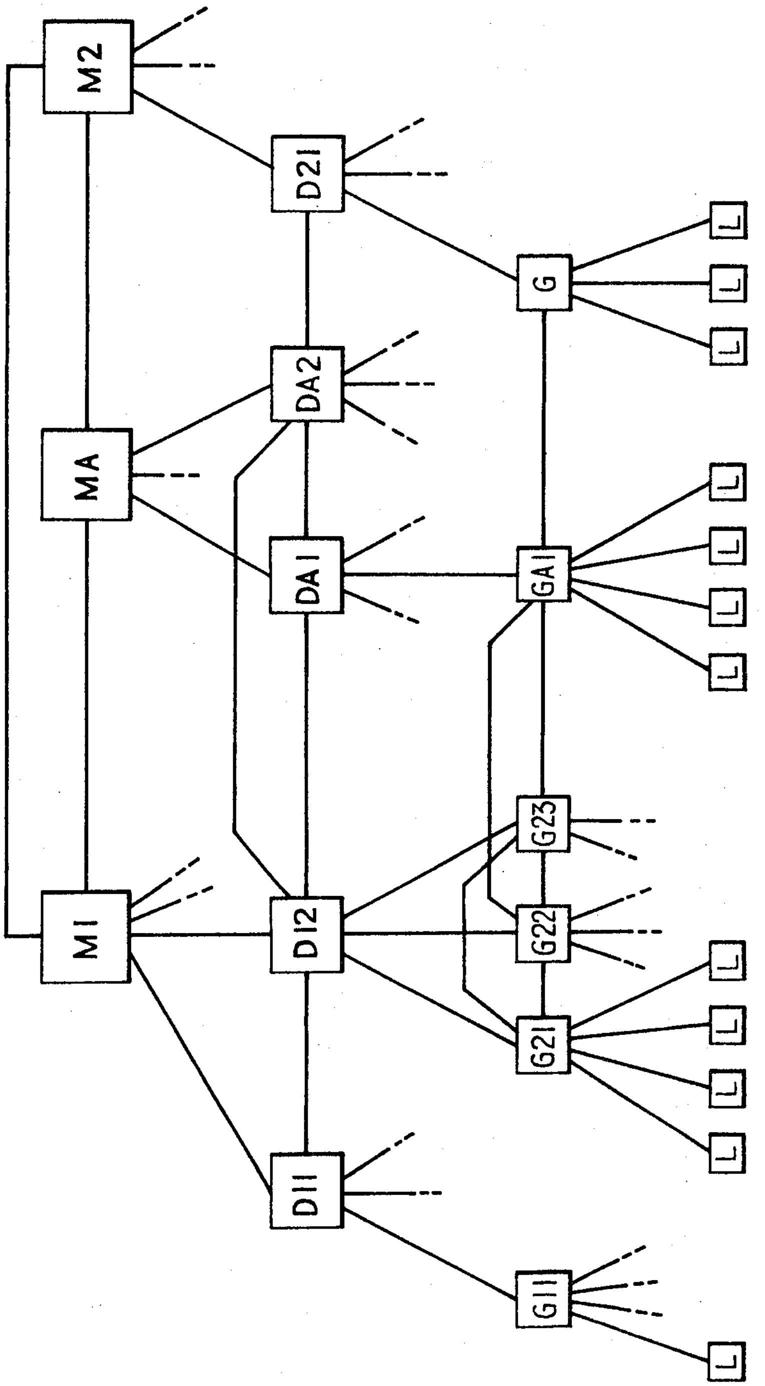
FIG. 1 illustrates the interconnection of a number of centers in a P.C.M. communication system.

FIG. 1 illustrates in a schematic manner relevant parts of a P.C.M. communications system in which the invention may be employed. The system has a number of main (primary) transmission centers (exchanges) including centers MA, M1, M2. MA is designated a master or reference center and is directly connected by transmission paths to each other main center in the system. Direct connections may also exist between other ones of the main centers, e.g., between M1 and M2 as shown in FIG. 1. Each main center is parent to a number of directly connected district transmission centers (D11, D12, DA1 etc.) which in turn are parent to directly connected group transmission centers (G11, G21, G22, etc.) to which local transmission centers L are connected, the latter operating on a slave basis to their parent group center and not, in the particular system being described, being relevant to this invention. For example main center M1 is parent to district centers including centers D11, D12 of which D11 is parent to group centers including G11, and D12 is parent to group centers including G21, G22, G23. Main center MA is parent to district centers DA1 and DA2 of which DA1 is shown as being parent to group centers including GA1. It will be appreciated that many more connections of the types referred to above will exist in a practical system.

Further, direct connections may exist between district centers e.g., between D12 and DA1 and DA2, between group centers e.g., between G22 and GA1 and G23 and GA1 and also direct connections may exist between district centers and non-parent main centers and also between group centers and non-parent district centers.

Each of the main, district and group transmission centers includes a local timing oscillator which determines the frame, slot and digit times of that center and also apparatus for synchronizing incoming digits to any center with the local digit times of that center. Such synchronizing apparatus includes means for adjusting the frequency of its own oscillator and for transmitting to and receiving from centers to which it is directly connected frequency error signals in order to reduce phase differences between the oscillators in the system. It will be seen from FIG. 1 that such a system includes a number of closed loops and it is possible for the oscillators of the centers comprising a loop to have relative phases such that there is a phase shift of 360° or a multiple thereof around the loop, causing the system to operate in an out-of-phase mode. This is undesirable and the embodiments of the invention to be described function to detect such a condition if it arises, and to cause temporary interruption of the control of the oscillators in all closed loops in the system leaving only control paths radiating from the reference or master control so that the system can revert to a stable, inphase mode of operation.

Figure 2:
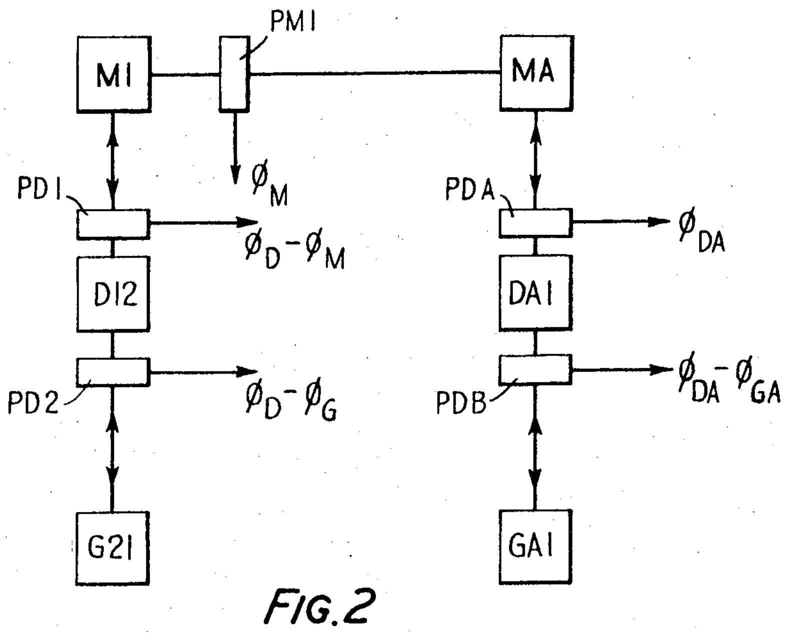
FIG. 2 illustrates a first embodiment of the invention.
Figure 3:
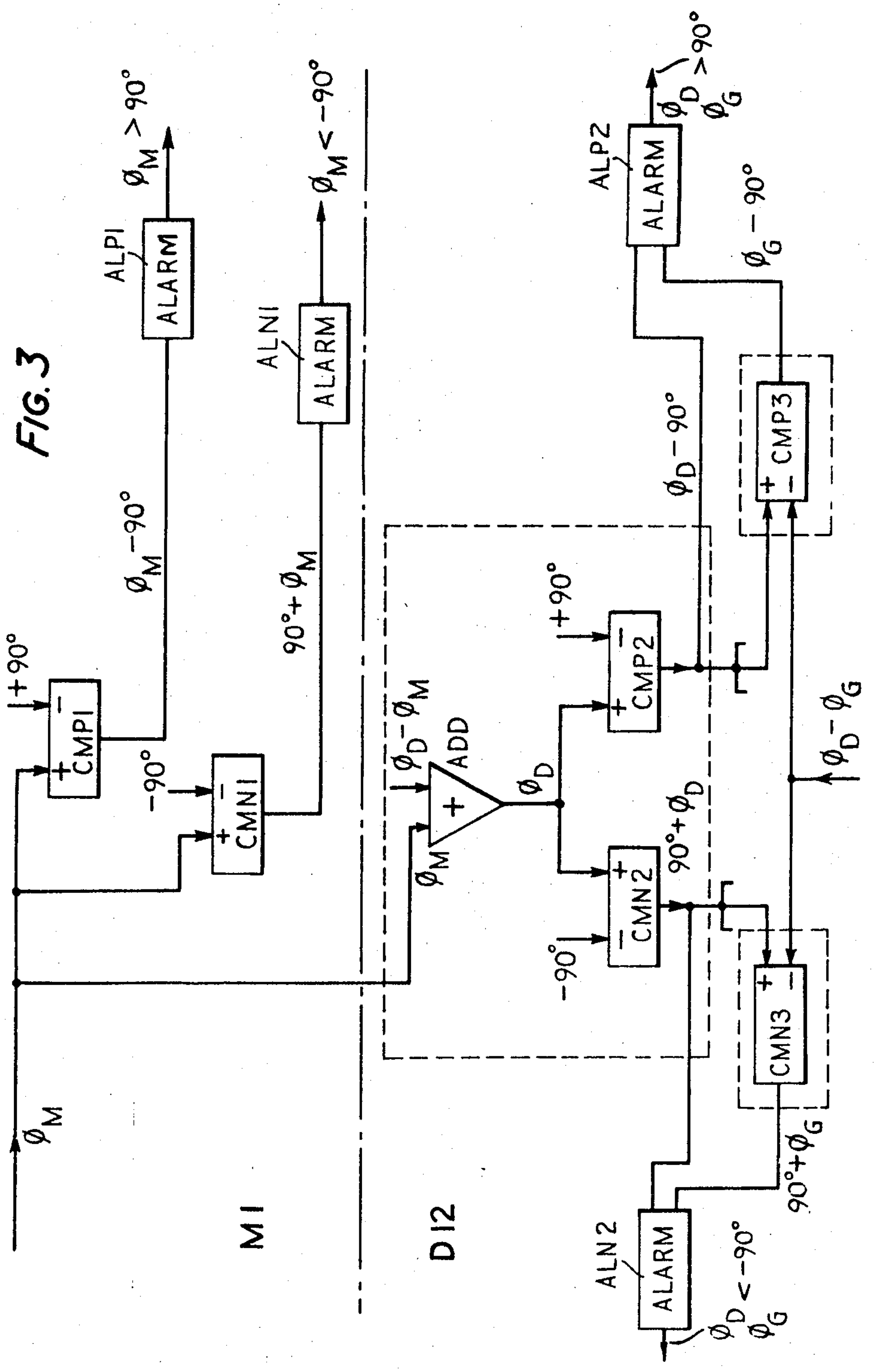
FIG. 3 illustrates the generation of an alarm signal at two of the centers shown in FIG. 2.

In describing a first embodiment of the invention, reference will be made to FIGS. 2 and 3. In the system to be described, one of the main centers, MA, is designated a reference center and the phases of all other oscillators in the system are referred to the phase of the MA center oscillator. FIG. 2 shows parts of FIG. 1 relevant to an explanation of detecting an out-of-phase mode in the system and, in particular, shows a transmission path from group center G21, parent district center D12, parent main center M1 to the master main center MA and also a transmission path from group center GA1 via its parent district center DA1 to the master center MA.

The main center M1 includes a phase comparator PM1 for comparing the arrival times of incoming digits to that center from the master center MA with digit times determined by its own oscillator to provide a signal $\phi_M$ indicative of the phase error of its oscillator relative to that of the master center oscillator. The district center D12 includes a phase comparator PD1 for comparing the arrival times of incoming digits from its parent center M1 with its own local digit times to provide a signal $\phi_D - \phi_M$ indicative of the phase difference between the oscillators of the centers D12 and M1. The center D12 also includes phase comparators for comparing the arrival times of incoming digits from its satellite group centers with its own local digit times to provide respective signals indicative of the phase differences between the oscillators of those group centers and the oscillator of their parent district center. One such comparator PD2 is shown in FIG. 2 associated with the group center G21 and provides a phase difference signal $\phi_D - \phi_G$.

The master center MA is connected directly to its satellite district center DA1 which has a phase comparator PDA similar to the comparator PD1 which produces a phase error signal $\phi_{DA}$ and a phase comparator PDB similar to the comparator PD2 which produces a phase difference signal $\phi_{DA} - \phi_{GA}$. Since the district center DA1 is connected directly to the master center MA, it does not have a comparator similar to comparator PD1 of center D12.

The equipment for detecting out-of-phase mode situations and generating alarm signals in response to such situations is, in the embodiment being described, associated with the main and district transmission centers. The equipment operates by recognizing a phase error of a main, district or group center oscillator having a magnitude greater than 90°, relative to the phase of the master center oscillator and one form of suitable equipment, suitable for the main center M1 and the district center D12, is shown in FIG. 3.

The main center M1 generates the phase error signal $\phi_M$ and applies it as an input to a comparator CMP1 which also receives an input representing a phase error of +90°. When the comparator output is positive, (i.e., $\phi_M > +90°$), an alarm is generated by the alarm generator ALP1. Similarly, the phase error signal $\phi_M$ is applied as an input to a comparator CMN1 which receives another input representing a phase error of −90°. When the comparator output is negative (i.e., $\phi_M < -90°$), an alarm is generated by the alarm generator ALN1. The comparators CMP1 and CMN1 thus provide for detection of a phase error of the oscillator of center M1 having a magnitude greater than 90° and for generation of an alarm signal in response to such a phase error.

The district center D12 receives from its parent center M1 the phase error signal $\phi_M$ and applies it as an input to an adder ADD which receives as another input the phase difference signal $\phi_D - \phi_M$ from the phase comparator PD1. The output of the adder is thus a phase error signal $\phi_D$ referred to the phase of the oscillator of the master center MA. This signal $\phi_D$ is applied as input to two comparators CMP2 and CMN2 which also receive inputs corresponding respectively to phase errors of +90° and −90°. When the output of comparator CMP2 is positive, an alarm is generated by the alarm generator ALP2 and when the output of comparator CMN2 is negative, an alarm is generated by the alarm generator ALN2. This provides means for detecting of phase errors of the oscillator of the district center D12 having a magnitude greater than 90° and for activating an alarm generator in such a situation.

The output of the comparator CMP2 is a phase difference signal $\phi_D - 90°$ whilst that of the comparator CMN2 is a phase difference signal $(90° + \phi_D)$ and these signals are applied as inputs to comparators CMP3 and CMN3 respectively each of which also receives a further input phase difference signal $\phi_D - \phi_G$ from the phase comparator PD2. When the output of comparator CMP3 is positive, then $\phi_G > +90°$ and an alarm is generated by the alarm generator ALP2 and when the output of comparator CMN3 is negative then $\phi_G < -90°$ and an alarm is generated by the alarm generator ALN2. Thus, provision is made for detecting a phase error of the oscillator of the group center G21, referred to that of the master center oscillator, having a magnitude greater than 90° and in consequence to operate an alarm generator.

When either of the alarm generators is actuated, an alarm signal is transmitted to the master main center MA.

Figure 4:
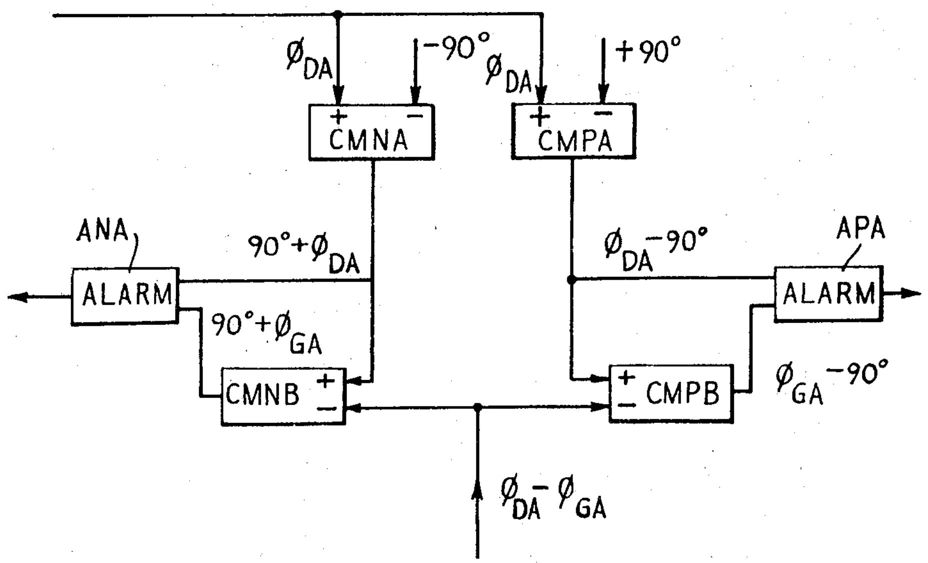
FIG. 4 illustrates the generation of an alarm signal at another of the centers shown in FIG. 2.

The out-of-phase mode detection equipment associated with the district center DA1 is somewhat simpler since that center has the master center MA as its parent. The equipment is shown in FIG. 4.

The phase error signal $\phi_{DA}$ from the phase comparator PA is fed as an input to comparators CMPA and CMNA which also receive inputs representing phase errors of +90° and −90° respectively. When the output of the comparator CMPA is positive, the alarm generator APA is actuated and when the output of comparator CMNA is negative the alarm generator ANA is actuated.

The output of the comparator CMPA represents a phase difference $90° - \phi_{DA}$ and is fed as an input to a comparator CMPB, whilst the output of the comparator CMNA, representing a phase difference of $90° + \phi_{DA}$, is fed as an input to a comparator CMNB. The comparators CMPB and CMNB also receive an input $\phi_{DA} - \phi_{GA}$ from the phase comparator PB. When the comparator CMPB produces a positive output, the alarm generator APA is actuated and when comparator CMPA produces a negative output the alarm generator ANA is actuated.

Actuation of either alarm generator APA and ANA causes transmission of an alarm signal to the master center MA as previously described.

To avoid the transmission of an alarm signal to the master center MA in response to transient out-of-phase excursions in the system, each district center D may include a timer in the alarm signal transmission path which inhibits transmission of the alarm signal until it has persisted for a predetermined length of time, for example, 10 seconds.

Figure 8:
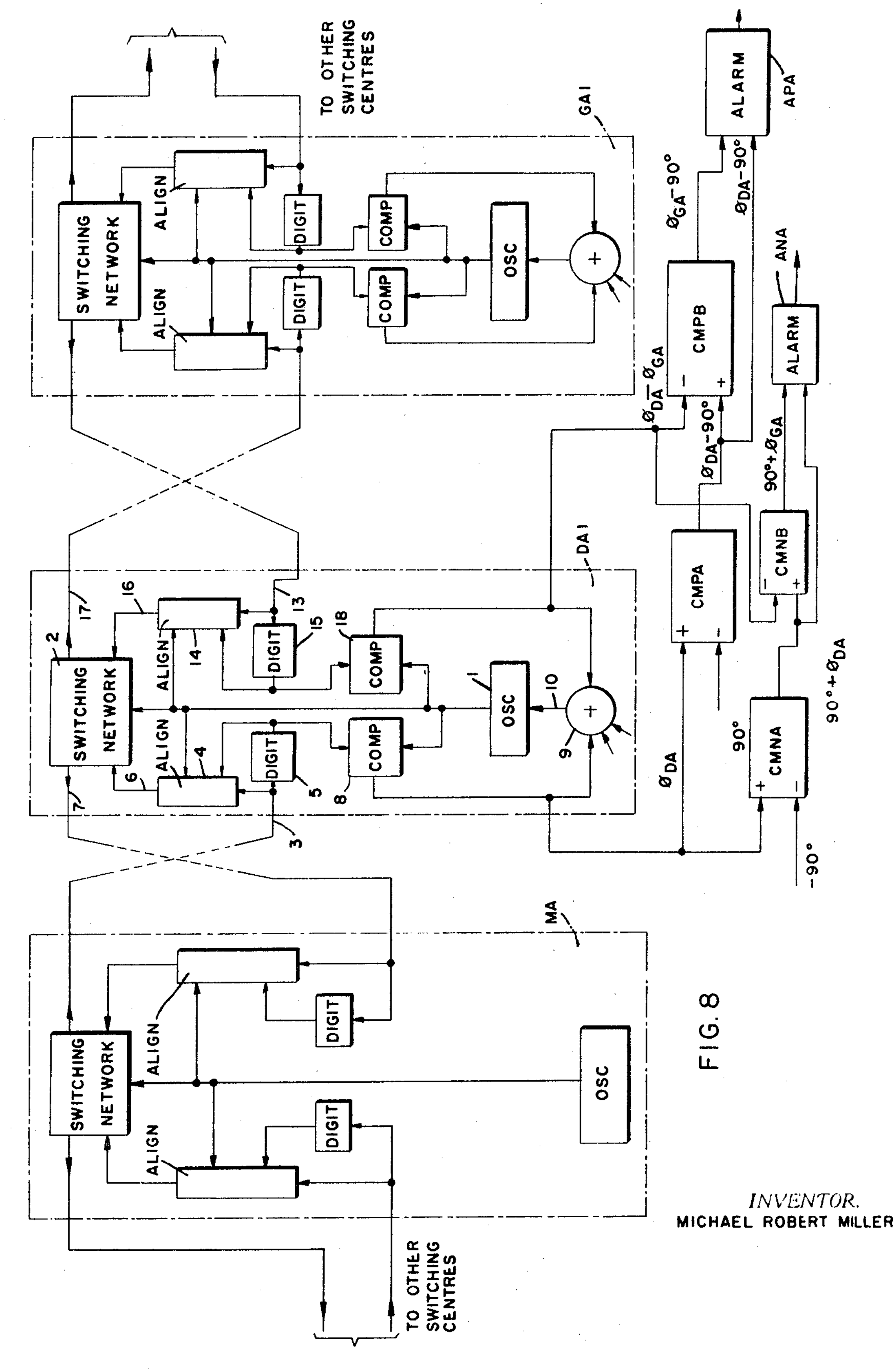
FIG. 8 is a block diagram further illustrating the relationships between elements of the system.

It will be recalled that the centers MA, M1, DA1, D12, etc., shown in FIG. 2 form part of a much larger system as shown in FIG. 1. The interconnections between the centers in the system result, as mentioned above, in closed-loop paths in the system: in FIG. 1, for example, there is a closed loop through the main centers MA, M1, M2, another closed loop through centers M1, D12, DA1, MA, and another through centers D12, G21, G22, G23. When the master center MA receives an alarm signal from any center in the system, (in the manner described above, for centers D12 and DA1) it reacts by sending out a "cut-off" signal to each center in the system. Upon receipt of the "cut-off" signal each center in the system reacts by disconnecting the connections providing control of its oscillator in response to the phase difference between its oscillators except that of its parent center. In this way, all the closed loops in the system will be broken allowing the system to revert to a stable in-phase mode of operation. For example, assuming that all the transmission path inter-connections in the system shown in FIG. 1 are functioning normally then the center M1 would, upon receipt of a "cut-off" signal cause the disconnection of the control of its oscillator in response to that of M2, leaving it controlled by that of the master center MA only. Similarly, the center D12 would, upon receipt of a "cut-off" signal cause the oscillator control connections D12 14 D11, D12 – DA1 and D12 – DA2 to be broken leaving the oscillator of center D12 controlled by that of the master center MA only, through center M1. Center G21 upon receipt of a cut-off signal would cause the oscillator control connections G21 – G23, and G21 – G22 to be broken also leaving its oscillator controlled by that of the master center MA through centers D12 and M1. FIG. 8 shows in more detail the switching centers MA, DA1 and GA1 as shown in FIG. 2 together with the out-of-phase detection equipment shown in FIG. 4. The transmission center DA1 is typical of the switching centers of the system, except for the reference center MA, and its constituent elements will now be described in detail. The digit times within the center DA1 are determined by an oscillator 1 which supplies clock pulses to a switching network 2. Incoming digital information from the reference center MA is received along a conductor 3 and applied to the aligner 4 of the P.C.M. system under the control of pulses from the digit time extraction circuit 5 to which the input signals are also applied. The input signals stored in the aligner 4 are read out by the clock pulses from the oscillator 1 and applied along a conductor 6 to the network 2. Output signals from the center DA1 are not re-timed but are transmitted along a conductor 7 to the reference center MA.

In order to measure the phase different between the incoming digital signals on the conductor 3 and the clock pulses from the oscillator 1, the output of the digit time extraction circuit 5 and the clock pulses from the oscillator 1 are applied to a phase comparison circuit 8 which produces an output signal representing the phase difference. This signal is applied to a summing circuit 9 from which a total signal is applied along a conductor 10 to control the frequency of the oscillator 1.

The center DA1 is also connected to the center GA1 and receives digital signals from that center over a conductor 13. In a similar way to that described above with reference to signals from the reference center MA, the signals are retimed by an aligner 14 under the control of pulses from a digit time extractor 15. The retimed pulses are applied to the switching network 2 via a conductor 16 and a conductor 17 is provided for outward signals from the switching network 2 feeding them to the center GA1 without retiming. Another comparator 18 is provided for comparing the clock pulses from the oscillator 1 with the signals from the digit time extractor 15 and the output of the comparator 18 representing the phase difference is applied to the summing circuit 9.

Using the terminology employed in FIGS. 2 and 4, the output of the comparator 8 represents ODA and that from the comparator 18 is ODA – OGA. These are applied to the combination of comparators shown in FIG. 4 to produce the alarm signals whenever ODA or OGA exceed in magnitude 90°.

It will be appreciated that for clarity of illustration the components of the center DA1 required for transmitting and receiving signals from the other centers to which it is connected, such as for example D12, DA2 are not shown in FIG. 8 but the signals representing the phase differences are also applied to the summing circuit 9 and the connections are represented by the three arrows shown in the figure.

Figure 5:
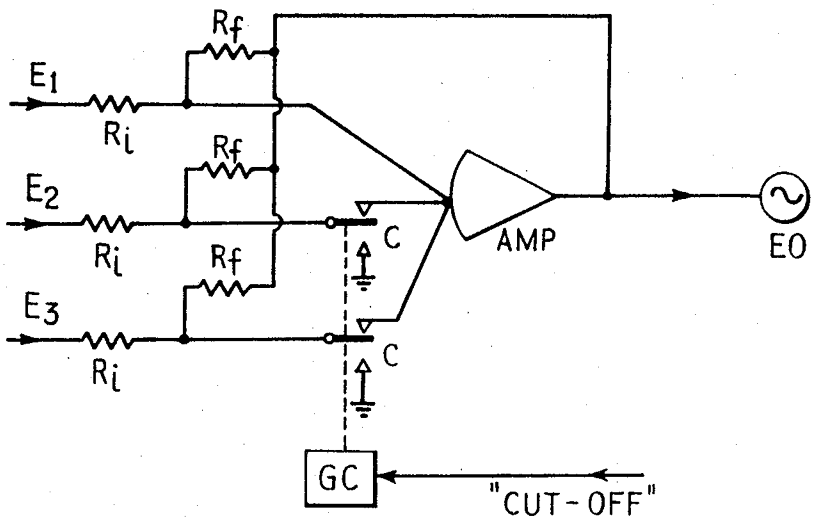
FIG. 5 illustrates the interruption, at one of the centers of FIG. 2, of links to directly connected centers.

The reference center MA differs from the other centers in that its oscillator is not subject to control in response to the phase difference between the incoming and local digit times and therefore this center does not include any comparators or a summing circuit for producing an oscillator frequency control signal. As mentioned above, each center in the system transmits to and receives from centers to which it is directly connected frequency error signals to reduce the phase differences between oscillators in the system. The frequency error signals received by a center are appropriately weighted and combined, and applied as a frequency control signal to the local oscillator at the center. When the links between centers are broken in response to a "cut-off" signal from the master center the weighting applied at each center to the incoming frequency error signals is adjusted accordingly and one way in which this adjustment may be achieved at any center is illustrated in FIG. 5.

When the system is operating normally, a plurality of incoming frequency error signals $E_1,E_2$ to the center are combined to provide a frequency control signal which is applied to the local oscillator EO. The error signals are represented in FIG. 5 as applied on input paths, each having an impedance $R_t$, to the common input terminal of a high gain amplifier AMP having a low impedance output path. The amplifier is represented as having a feedback path for each input path, each feedback path having impedance $R_f$. There is also provision as indicated by the contact sets C for disconnecting from the amplifier and connecting to earth, each input path except one. This one input path carries the error signal from the parent center to which the center remains linked upon receipt of a "cut-off" signal from the master center MA.

When the system is operating normally the center receives an error signal from each center to which it is directly connected; suppose that it is directly connected to $m$ centers. Since the amplifier AMP has a high gain factor, the gain factor of each of the $m$ input paths is $R_f/mR_t$, this representing the weighting that is applied to each of the error signals before they are combined to give the frequency control signal for the local oscillator. When a "cut-off" signal from the master center MA is received at the center, gain control equipment GC causes operation of the contact sets C leaving only one input path to the amplifier AMP with gain factor $R_f/R_t$, representing an adjusted weighting factor applied to the single incoming error signal from the parent center. Reference may be made in this connection to British Patent Specification No. 1,219,082.

If the link to the parent center is not functioning normally when a "cut-off" signal is received (the link may, for example, already be broken) then it is necessary that an alternative parent center be automatically selected upon receipt of a "cut-off" signal, the link to the alternative parent center being retained when the other links are broken to correct an out-of-phase mode of operation. One way in which automatic selection of an alternative parent may be achieved is illustrated in FIG. 6.

Figure 6:
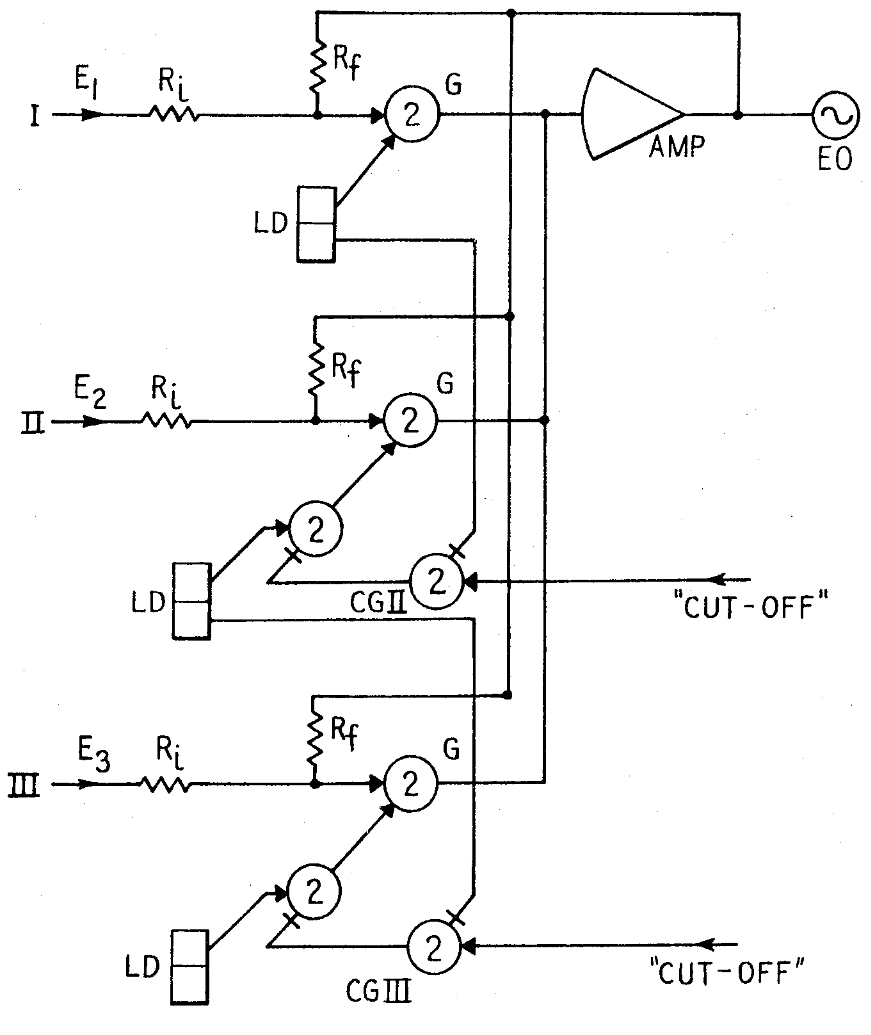
FIG. 6 illustrates the selection, at one of the centers of FIG. 2, of an alternative parent center.

FIG. 6 represents the parent selection equipment for one center and, as in FIG. 5 the incoming frequency error signals from directly connected centers are represented as applied to a common input terminal of a high-gain amplifier AMP. The input path I represents the link to the parent and the input paths II and III the links to the first and second alternative parents. It will be appreciated that there may be other input paths, these being the fourth, fifth, etc. alternative parents. Link detection equipment LD determines whether or not each link to a directly connected center is functioning correctly. When a link is functioning correctly, a signal is applied to a gate G in the input path to the amplifier, allowing the incoming frequency error signal to pass to the amplifier. "Cut-off" signals from the master center are applied to gates CGII, CGIII associated with the links II, III to alternative parent centers, but not that (I) to the parent center. If the link to the parent center is functioning correctly the application of a cut-off signal to the gates CG removes the signal from the link-detecting equipment to the associated gates G thereby breaking all input paths to the amplifier AMP except that (I) from the parent. This corresponds to the situation already described with reference to FIG. 5. If the link to the parent center is not functioning correctly, the link detection equipment causes a signal to be applied to the gate CGII associated with the link to the first alternative parent which causes the signal from the link-detecting equipment to the associated gate G to be maintained upon the application of a "cut-off" signal to that gate CGII. If the link to the first alternative parent is not functioning correctly, the link detection equipment causes a signal to be applied to the gate CGIII associated with the second alternative parent, the link to the second alternative parent thereby being maintained in a similar manner.

A second embodiment of the invention operates on the basis that if a center is connected to a master center over $n$ links (i.e., via $n-1$ other centers) and if that center is operating in an out-of-phase mode there must be over at least one of those links a phase difference of magnitude at least $90°/n$. In the system shown in FIG. 1 for example, if any one of the group centers G is operating in an out-of-phase mode then, since there are three links between it and the master center MA (i.e., group center 130 district center, district center — main center and main center—master center) there will be over at least one of these links, a phase difference of magnitude at least 90°13. In this system, if any of the centers detects a phase difference between itself and a directly connected parent center of at least 30° in magnitude then an alarm signal is sent out to the main center MA which in turn send out a "cut-off" signal causing the closed loops in the system to be broken as described above.

Figure 7:
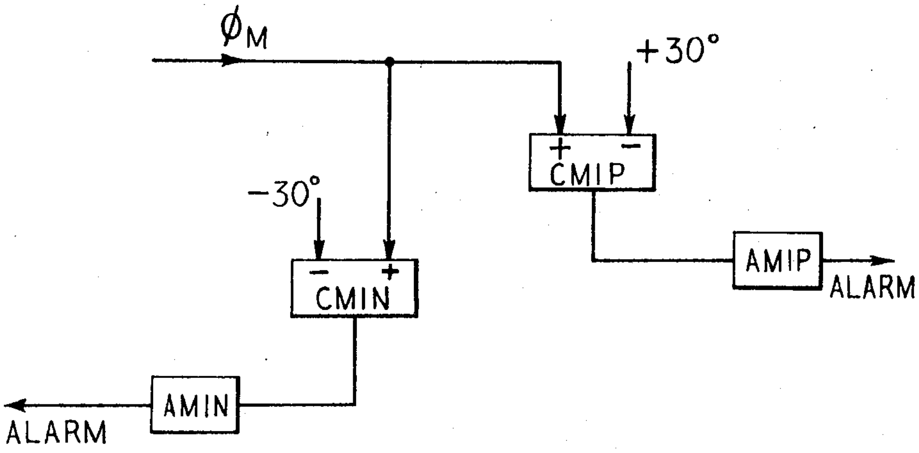
FIG. 7 illustrates the generation of an alarm signal at one of the centers in a second embodiment of the invention.

The manner of generating the alarm signal is illustrated in FIG. 7. This equipment is applicable to any center in the system, but will be assumed to be located at the main center M1 in FIG. 1. As before, the main center M1 includes a phase comparator (not shown) for comparing the arrival times of incoming digits to that center from the master center MA with the digit-times determined by its own oscillator to provide a signal $\phi_M$ indicative of the phase difference between its own oscillator and that at the master center. This signal $\phi_M$ is applied to a comparator CM1P together with another input representing a phase difference of $+30°$. When the comparator output is positive (i.e., $\phi_M > 30°$) an actuating input is applied to an alarm generator AM1P. The signal $\phi_M$ is also applied in negative form to a comparator CM1N together with another input representing a phase difference of $-30°$. When the comparator output is negative (i.e., $\phi_M < -30°$) an actuating input is applied to an alarm generator AM1N.

When either of the alarm generators AM1P, AM1N is actuated an alarm signal is transmitted, via a timer, to the master center MA as before. The master center in turn sends out a "cut-off" signal to each center in the system and subsequent operation is exactly as described above with reference to FIGS. 5 and 6. As before the timer inhibits transmission of an alarm signal until it has persisted for a predetermined length of time (for example 10 seconds) to eliminate the effect of transient out-of-phase excursions in the system.

Each center M, D and G in the system has a phase comparator for determining the phase difference between its own oscillator and that at its directly connected parent center and equipment similar to that shown in FIG. 7 for determining whether this phase difference is greater in magnitude than 30°. The center G11 in FIG. 1, for example would determine the phase difference $\phi_G - \phi_D$ between its own oscillator and that at the center D11 and compare the magnitude of this phase difference with 30°, generating an alarm signal when the magnitude exceeds 30°.

I claim:

1. A digital communications system including at least three transmission centers interconnected by transmission paths, each center having a local timing oscillator which determines the digit times of that center, the frequency of the oscillator being adjustable in response to a control signal, one of said centers being designated as the reference center, and there being provided in each one of the other centers comparator means for comparing the times of digits generated at that center with the times of digits received at that center from each other center to which it is connected by a transmission path for producing an output representing the phase difference between the compared digits, means in each center for combining the outputs of the comparator means of that center to produce the control signal tending to bring the local timing oscillator of that center into synchronism with that of the reference center, the system further including means for producing an alarm signal whenever the condition exists that the time difference representing the phase difference between the local oscillators of any one of the other centers and the local oscillator of the reference center exceeds in magnitude a threshold value not greater than 90° for a predetermined period of time, and means responsive to the alarm signal to cause the control signal of the local timing oscillator of each one of the other centers to become dependent on the output of a single one only of the comparator means of the particular center until the condition is removed.

2. A system according to claim 1, wherein each of said other centers there is provided means for transmitting indications of the outputs of the comparator means from that center to other centers in such a way that indications can be combined to provide a signal representing the phase difference, between the local timing oscillator of that center and the timing oscillator of the reference center.

3. A system according to claim 2, in which the alarm signal is transmitted to the reference center, which center includes means responsive to a received alarm signal to transmit a regulating signal to each of the other centers to render the control signal of the local timing oscillator of that center to be dependent on the output of one only of the comparator means of that center.

4. A system according to claim 3, in which the combining means comprises means for weighting the outputs of the comparators by a factor proportional to the reciprocal of the number of comparator outputs effectively applied to the combining means, and means for adding together the weighted outputs to produce the control signal.

5. A system according to claim 4, in which the regulating signal renders ineffective all but one of the inputs of the combining means.

6. A system according to claim 5, in which each of the other centers includes means for indicating the correct functioning of each transmission path connected to the center and the combining means is arranged to respond to the regulating signal and the outputs of the comparator means to leave only a single input to the combining means in an effective condition, the input being the first of the transmission paths taken in a predetermined order which is correctly functioning.

7. A system according to claim 1, in which the threshold value represents a phase difference of 90°.

8. A digital communications system including a plurality of transmission centers interconnected by transmission paths to form at least one closed loop and a chain of $n$ centers connected in series, each center having a local timing oscillator which determines the digit times of that center, the frequency of the oscillator being adjustable in response to a control signal and there being provided in each one of the centers, comparator means for comparing the times of digits generated at that center with the times of digits received at that center from each other center to which it is connected by a transmission path for producing an output representing the phase differences between the compared digits, means in each center for combining the outputs of the comparator means of that center to produce the control signal tending to bring the local timing oscillator of that center into synchronism with that of the reference center, the system further including means for producing an alarm signal whenever the condition exists that the time difference representing a phase difference between the local oscillators of two adjacent centers in the chain exceeds in magnitude a threshold value not greater than $90°/n$ for a predetermined period of time, and means responsive to the alarm signal to cause the control signal of the local timing oscillator of a center in the or each closed loop to become dependent on the output of a single one only of the comparator means of the particular center until the condition is removed.

* * * * *